United States Patent [19]

Richman et al.

[11] Patent Number: 4,561,558
[45] Date of Patent: Dec. 31, 1985

[54] VENT COVER

[75] Inventors: Lonnie J. Richman, Eastlake; Edward F. Stockmaster, Mentor, both of Ohio

[73] Assignee: The Babcock & Wilcox Company, New Orleans, La.

[21] Appl. No.: 661,014

[22] Filed: Oct. 15, 1984

[51] Int. Cl.<sup>4</sup> ............................................. B65D 51/16
[52] U.S. Cl. ..................................... 220/203; 220/367
[58] Field of Search ............... 220/203, 206, 367, 208, 220/202; 137/467, 533

[56] References Cited
U.S. PATENT DOCUMENTS 4,143,787  3/1979  Walker ................................. 220/203

Primary Examiner—George T. Hall
Attorney, Agent, or Firm—Vytas R Matas; Robert J Edwards

[57] ABSTRACT

A vent cover that permits venting of an enclosure and prevents the entry of contaminants into the enclosure is disclosed. The vent cover is integrally formed from an elastomeric material and has a cup-shaped main portion and an outwardly extending stem member which is received within an aperture in the enclosure. The stem member is slidingly movable within the enclosure causing the main portion of the vent cover to be in a non-contacting relationship with the enclosure when venting is required and to be in a contacting relationship with the enclosure when sealing of the enclosure from external contaminants is required.

7 Claims, 4 Drawing Figures

VENT COVER

TECHNICAL FIELD

This invention generally relates to a device which permits an equipment enclosure, such as an industrial control housing, to be vented, and more particularly to a vent cover which permits the venting of the enclosure and also prevents the introduction of contaminants into the enclosure.

BACKGROUND ART

Many enclosures for industrial controls, e.g., pneumatic positioners, require venting. Typically, such venting is accomplished by cutting a hole in one of the exterior surfaces of the enclosure and covering the hole with a fine mesh screen. This approach does permit venting, however, it does not prevent windblown dust and rain, splashing water, hose-directed water, etc., from entering the enclosure and possibly damaging the contents thereof. Thus, this venting technique and other variations thereof are unsatisfactory since they may result in undesirable damage to the controls contained within the enclosure and costly downtime for the machine or device being regulated by the controls.

Because of the foregoing, it has become desirable to develop a device which permits the venting of an enclosure and prevents the entry of contaminants into the enclosure.

SUMMARY OF THE INVENTION

The present invention solves the aforementioned problems associated with the prior art as well as other problems by providing a vent cover that permits venting of an enclosure and prevents the entry of contaminants into the enclosure. The vent cover is formed from an elastomeric material, such as BUNA-N rubber, and is comprised of a cup-shaped main portion with a stem member directed outwardly therefrom. The enclosure to be vented is provided with an outwardly extending sleeve which surrounds one or more vent openings and an aperture for the receipt of the stem member. Under normal operating conditions, venting of the enclosure is accomplished via the vent openings. When the enclosure is exposed to contaminants, the stem member moves inwardly into the enclosure causing the cup-shaped main portion of the vent cover to contact the outwardly extending sleeve and the surface of the enclosure, thus sealing same.

DESCRIPTION OF THE PREFERRED EMBODIMENT

Figure 1:
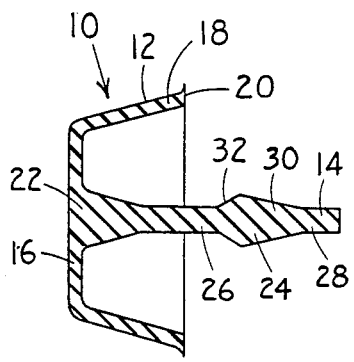
FIG. 1 is a cross-sectional view of a vent cover constructed in accordance with the present invention.

Referring now to the drawings, in which like reference characters designate like or corresponding parts throughout the several views, there is shown a one-piece integrally molded vent cover designated generally by the numeral 10, comprising a cup-shaped main portion 12 and a stem member 14 mounted substantially centrally within the main portion 12.

The vent cover 10 is integrally molded from an elastomeric material, such as BUNA-N rubber, and, as such, is very flexible which assists in the sealing process, hereinafter described. The main portion 12 of the vent cover 10 is comprised of a circular base portion 16 which terminates in a frusto-conical wall portion 18 forming a cup shape. The circumferential end 20 of the frusto-conical wall portion 18 is flared slightly outwardly for sealing purposes, hereinafter described.

The stem member 14 is circular in cross-section throughout its entire length and is comprised of a frusto-conical portion 22, an enlarged circumferential portion 24, a first diameter portion 26 interposed between the frusto-conical portion 22 and one end of the enlarged circumferential portion 24, and a second diameter portion 28 connected to and directed outwardly from the other end of the enlarged circumferential portion 24. The stem member 14 is integrally molded to the cup-shaped main portion 12 of the cover 10 and its axis is substantially perpendicular to the base portion 16 of the cover 10 and intercepts the base portion at the approximate center thereof. The frusto-conical portion 22 of the stem member 14 is positioned so that its base is adjacent the inner surface of the base portion 16 of the cover 10. The opposite end of the frusto-conical portion 22 terminates in the first diameter portion 26. The diameter of the first diameter portion 26 is slightly less than the diameter of the aperture in which the stem member 14 is to be inserted and the axial length of the first diameter portion 26 is greater than the thickness of the material in which the aperture is located.

The enlarged circumferential portion 24 of the stem member 14 is comprised of a frusto-conical portion 30 and a conically beveled surface 32 positioned in an abutting relationship. The diameter of the base of the frusto-conical portion 30, i.e., at its junction with the conically beveled surface 32 is greater than the diameter of the aperture in which the stem member 14 is to be inserted, and the surface of the frusto-conical portion 30 acts as a "lead-in" surface during the insertion process. In this manner, the surface of the frusto-conical portion 30 permits the insertion of the stem member 14 into an aperture and the base of the frusto-conical portion 30 impedes the easy removal of the stem member from same.

The base of the frusto-conical portion 30 terminates in the conically beveled surface 32 which, in turn, terminates in the first diameter portion 26 of the stem member 14. The opposite end of the frusto-conical portion 30 terminates in the second diameter portion 28 of the stem member 14. The diameter of the second diameter portion 28 is less than or equal to the diameter of the first diameter portion 26 and its axial length is sufficient to permit it to act as a "pilot tip" for the stem member 14 during the insertion process.

Figure 2:
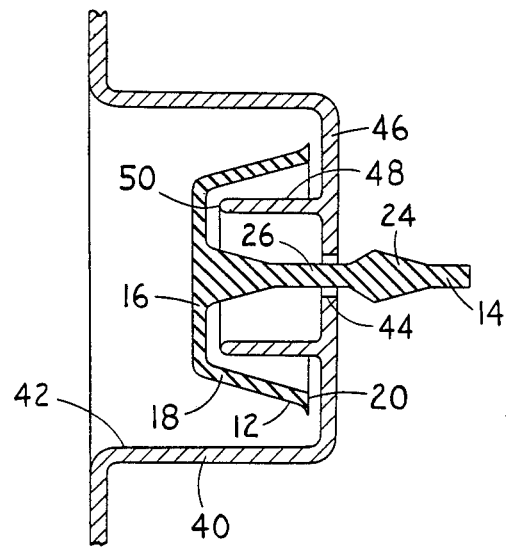
FIG. 2 is a cross-sectional view of the vent cover, shown in FIG. 1, installed in an enclosure to vent same, and illustrates the position of the vent cover with respect to the enclosure when the enclosure is being vented.
Figure 4:
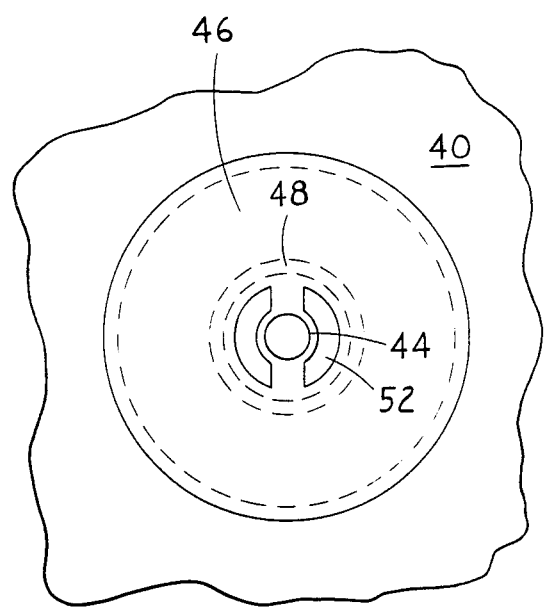
FIG. 4 is an end elevation view of a portion of the enclosure to be vented and illustrates the vent openings provided therein.

FIG. 2 illustrates the vent cover 10 installed in an enclosure 40, such as an enclosure for a pneumatic positioner, and shows the position of the vent cover with respect to the enclosure when the enclosure is being vented. The enclosure 40 is provided with a circular recess 42 having a diameter greater than the diameter of the vent cover 10 and having a depth greater than the height of the cup-shaped main portion 12 of the cover 10. An aperture 44 having a diameter slightly greater than the diameter of the first diameter portion 26 but less than the diameter of the enlarged circumferential portion 24 of the stem member 14 is positioned substantially centrally in the base 46 of the recess 42. An outwardly extending sleeve 48 is connected to the base 46 is the recess 42 and surrounds the aperture 44 provided therein. The inner diameter of the sleeve 48 is greater than the outer diameter of the stem member 14, and the outer diameter of the sleeve 48 is less than the diameter of the base portion 16 of the vent cover 10 permitting the stem member 14 to be received within the sleeve 48 and allowing the cup-shaped main portion 12 of the cover 10 to be in a surrounding relationship with respect to the sleeve 48. The axial length of the sleeve 48 is slightly less than the depth of the cup-shaped main portion 12 of the vent cover 10 permitting the end 50 of the sleeve 48 to come into contact with the inner surface of the base portion 16 of the cover 10 and allowing the circumferential end 20 of the frusto-conical wall portion 18 to come into contact with the base 46 of the recess 42. One or more vent openings 52, as shown in FIG. 4, are provided in the base 46 of the recess 42 and are positioned so as to be within the inner diameter of the sleeve 48 and in a surrounding relationship to the aperture 44.

Figure 3:
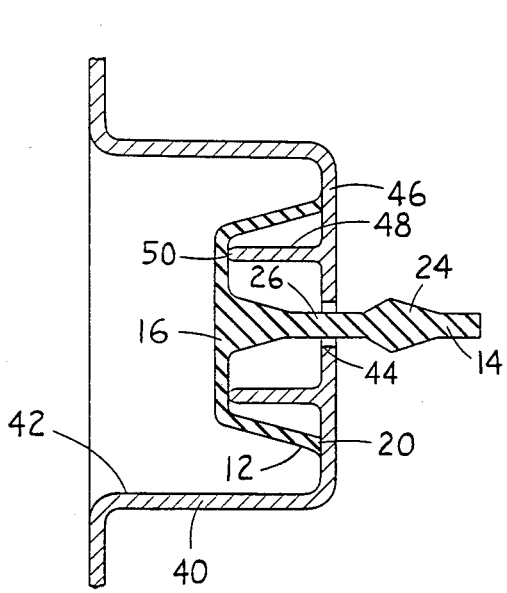
FIG. 3 is a cross-sectional view of the vent cover, shown in FIG. 1, installed in an enclosure to vent same, and illustrates the position of the vent cover with respect to the enclosure when the enclosure is being sealed against the entry of contaminants.

In operation, the vent cover 10 is typically in a non-sealing relationship (FIG. 2) with respect to the enclosure 40, i.e., the inner surface of the base portion 16 of the cover is not contacting the end 50 of the sleeve 48 and the circumferential end 20 of the frusto-conical wall portion 18 is not contacting the base 46 of the recess 42. In this orientation, venting of the enclosure 40 via the vent openings 52 can occur. If, however, the vent cover 10 is exposed to an external force, such as water spray, etc., the vent cover 10 moves inwardly into a contacting, sealing relationship with the enclosure 40 (FIG. 3) preventing the introduction of any contaminants therein. When the vent cover 10 is exposed to such an external force, the stem member 14 moves inwardly through the aperture 44 into the enclosure 40 until the inner surface of the base portion 16 of the cover 10 contacts the end 50 of the sleeve 48. In this orientation, the end 20 of the frusto-conical wall portion 18 of the cover 10 sealingly contacts the base 46 of the recess 42. Thus, the vent cover 10 provides two sealing surfaces, i.e., the inner surface of the base portion 16 of the cover 10 against the end of the sleeve 48 and the end 20 of the frusto-conical wall portion 18 of the cover 10 against the base 46 of the recess 42. These two sealing surfaces ensure that no contaminants enter the enclosure 40 via the vent openings 52. When the external force is subsequently removed from the vent cover 10, the stem member 14 moves outwardly through the aperture 44 breaking the foregoing two sealing surfaces permitting the venting of the enclosure 40 via the vent openings 52.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. A device for venting an enclosure comprising a base member and a stem member connected to said base member, said stem member being received within an aperture in the enclosure and being slidingly movable within the aperture between a first position and a second position, said base member being in a non-contacting relationship with the enclosure when said stem member is in said first position and being in a contacting relationship with the enclosure when said stem member is in said second position and wherein said base member is cup-shaped and said stem member is directed outwardly from the bottom of said cup shape.

2. The device as defined in claim 1 wherein said base member permits venting of the enclosure when said stem member is in said first position.

3. The device as defined in claim 1 wherein said base member prevents venting of the enclosure when said stem member is in said second position.

4. The device as defined in claim 1 wherein said base member contacts the enclosure on at least one enclosure surface when said stem member is in said second position.

5. The device as defined in claim 1 wherein said stem member is located approximately in the center of said base member.

6. The device as defined in claim 1 wherein said stem member includes an enlarged area thereon, said enlarged area preventing the removal of said stem member from the aperture in the enclosure.

7. The device as defined in claim 1 wherein said base portion and said stem member are integrally molded from an elastomeric material.

* * * * *